(12) United States Patent
Park

(10) Patent No.: US 10,953,903 B1
(45) Date of Patent: Mar. 23, 2021

(54) PORTABLE FOLDING CART

(71) Applicant: HKD Global Limited, Hong Kong (CN)

(72) Inventor: Bum Jun Park, Seoul (KR)

(73) Assignee: HKD GLOBAL LIMITED, Hong Kong (CN)

( * ) Notice: Subject to any disclaimer, the term of this patent is extended or adjusted under 35 U.S.C. 154(b) by 0 days.

(21) Appl. No.: 16/580,947

(22) Filed: Sep. 24, 2019

(51) Int. Cl.
*B62B 3/02* (2006.01)
*B62B 5/06* (2006.01)

(52) U.S. Cl.
CPC ............... *B62B 3/02* (2013.01); *B62B 5/067* (2013.01); *B62B 2205/02* (2013.01); *B62B 2205/06* (2013.01)

(58) Field of Classification Search
CPC ....... B62B 5/06; B62B 3/04; B62B 2202/404; B62B 3/022; B62B 3/02
See application file for complete search history.

(56) References Cited

U.S. PATENT DOCUMENTS

| 9,073,564 | B2 | 7/2015 | Yang et al. | |
| 9,145,154 | B1* | 9/2015 | Horowitz | B62B 3/025 |
| 9,738,298 | B1* | 8/2017 | Yang | B62B 5/0003 |
| 10,040,470 | B1* | 8/2018 | Horowitz | B62B 3/007 |
| 10,099,711 | B1* | 10/2018 | Sun | B62B 3/025 |
| 10,633,010 | B1* | 4/2020 | Zhang | B62B 3/025 |
| 2010/0090444 | A1* | 4/2010 | Chen | B62B 3/007 |
| | | | | 280/651 |

FOREIGN PATENT DOCUMENTS

JP 3217563 U 8/2018
KR 20-0488648 Y1 6/2019

* cited by examiner

*Primary Examiner* — John D Walters
*Assistant Examiner* — James J Triggs
(74) *Attorney, Agent, or Firm* — Novick, Kim & Lee, PLLC; Jae Youn Kim

(57) ABSTRACT

Provided is a portable folding cart including two folding rods, a base structure, a tow rod, and pulling devices that are located at both insides of scissors-bar assemblies and provided folded and unfolded together with scissors-bar assemblies so as to allow a user to conveniently and stably perform a folding process with the scissors-bar assemblies without lying or bending a body down. Therefore, the portable folding cart is conveniently and stably folded so that durability and reliability are increased.

4 Claims, 8 Drawing Sheets

PORTABLE FOLDING CART

BACKGROUND OF THE INVENTION

1. Field of the Invention

The present invention relates to a portable folding cart, and more particularly, to a portable folding cart including folding rods located at both insides of scissors-bar assemblies that are folded and unfolded so as to allow a user to conveniently and stably perform a folding process with the scissors-bar assemblies without lying or bending down.

2. Description of the Related Art

In general, a portable folding cart is one of movable carrying tools. The portable folding cart is folded and stored when not in use and unfolded when in use so as to be used to accommodate and move a necessary object.

U.S. Pat. No. 9,073,564 (hereinafter, referred to as "related art document 1") related to the portable folding cart discloses a wagon which includes scissors-bar assemblies folded and unfolded between corners of a rectangular frame; and pole assemblies provided radially towards a center so as to be folded and unfolded together with the scissors-bar assemblies while ascending and descending vertically to a bottom surface; and a liner covering the corner frame, the scissors-bar assemblies and the pole assemblies.

Japanese Utility Model Registration No. 3217563 (hereinafter referred to as "related art document 2") discloses a portable folding cart including scissor units including casters and folded and unfolded between frames located at each corner; and center connection sockets to which bottom rods directed toward a center are connected so as to be folded and unfolded on both sides of a bottom surface together with the scissor units.

Korean Utility Model Registration No. 20-0488648 (hereinafter referred to as "related art document 3") discloses a one-touch type folding cart including a link portion including link members radially and rotatably formed toward a center to bracket portions provided in a vertical bar portion so as to be conveniently folded or unfolded by a control portion and a bending maintaining portion; and the control portion folded and unfolded together with a side portion by raising the center of the link portion.

DOCUMENTS OF RELATED ART ARE AS FOLLOWS

U.S. Pat. No. 9,073,564
Japanese Utility Model Registration No. 3217563
Korean Utility Model Registration No. 20-0488648

SUMMARY OF THE INVENTION

The techniques disclosed in the documents of related arts 1 to 3 have an inconvenient disadvantage in that the longitudinal and lateral sides are folded according to vertical movements at a center of a bottom surface, and thus a user is required to lie down, bend down, and stretch an arm to raise the center and fold the cart.

To solve the above problem in the related art, the present invention provides a portable folding cart including folding rods located at both insides of scissors-bar assemblies that are folded and unfolded so as to allow a user to conveniently and stably perform a folding process with the scissors-bar assemblies without lying or bending down.

The present invention further provides a portable folding cart including a tow rod easily adjusted in a length thereof according to a body of the user when the portable folding cart is towed.

The present invention still further provides a portable folding cart that is quickly foldable as the user raises pulling devices provided on both sides of the portable folding cart.

To solve the above technical problems, the portable folding cart according to the present invention includes: corner bars located at corners of a rectangle and provided at bottoms thereof with casters and lower sockets and at tops thereof with upper sockets, respectively; scissors-bar assemblies folded or unfolded between the lower sockets and the upper sockets; a liner which has upper corners fixed to the upper sockets and is fixed to the corner bars by pads formed on corner sides of the liner; two folding rods in which each folding rod includes first and second folding rods, which have one ends rotatably connected to the lower sockets located at front and rear sides in a progressive direction of the portable folding cart, respectively, and opposite ends connected to a folding bracket folded upward only in an inversed 'V' shape, such that the two folding rods are folded and unfolded together with the scissors-bar assemblies; a base structure including a pair of scissors-bars folded and unfolded at both sides of the folding brackets and connected to the two folding rods, in which ends of the pair of scissors-bars, which face each other, are rotatably fixed to the folding brackets, and opposite ends of the pair of scissors-bars are slidably connected to the folding rods; a tow rod including a support rod having both ends rotatably connected to the lower sockets and a middle portion rotatably connected to a connection bracket, and a handle provided at a top of the tow rod to allow the tow rod to be telescopically coupled with the connection bracket; and pulling devices provided on both sides of the liner and connected to the folding brackets to allow the scissors-bar assemblies, the folding rods, and the support rod to be folded.

The opposite ends of the scissors-bar slidably provided to the folded rods may be rotatably connected to slide holders provided on the folding rods.

The tow rod may include first and second tow rods having diameters different from each other, so that the tow rod is telescopically movable as a fixing holder provided at a sliding portion of the tow rod is fastened or released.

The pulling devices may include guide pockets formed on inner surfaces of the both sides of the liner, and pulling straps disposed inside the guide pockets and connected to the folding brackets, respectively.

The portable folding cart according to the present invention includes folding rods located at both insides of scissors-bar assemblies that are folded and unfolded so as to allow the user to conveniently and stably perform a folding process with the scissors-bar assemblies without lying or bending down. Thus, the convenience in use can be provided to the user, and the durability and the reliability can be increased due to the stable folding.

In addition, the length of the tow rod may be easily adjusted according to a body of the user when the cart is towed, so that the highly compatibility can be provided to any user.

In addition, the portable folding cart may be quickly folded as the user raises pulling devices provided on both sides of the portable folding cart, so that the folding process can be simply and conveniently performed.

DETAILED DESCRIPTION OF THE INVENTION

Hereinafter, preferred embodiments of the present invention will be described in detail with reference to the accompanying drawings, and the present invention is not limited to or restricted by the embodiments.

Figure 1:
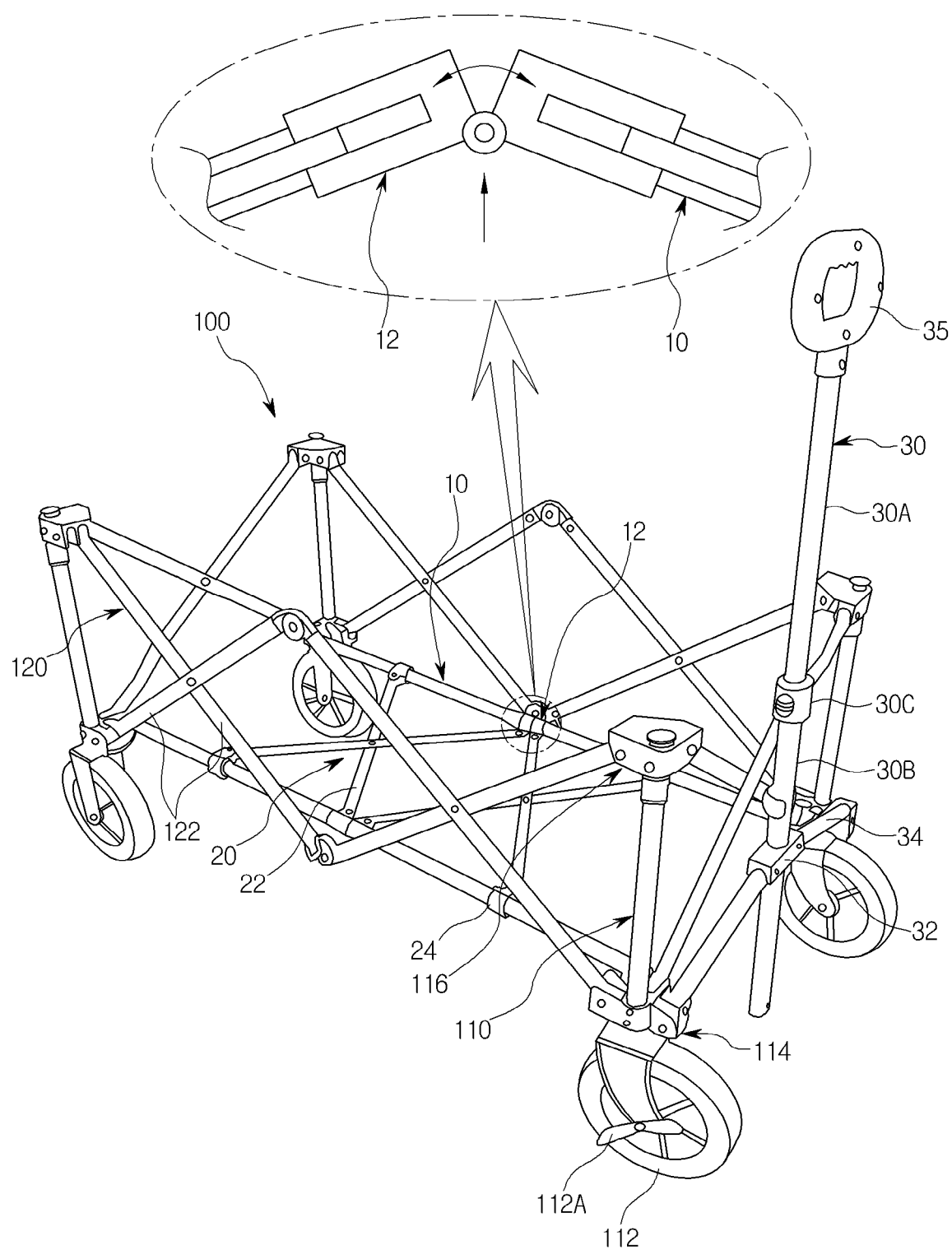
FIG. 1 is a perspective view of a portable folding cart according to the present invention.
Figure 2:
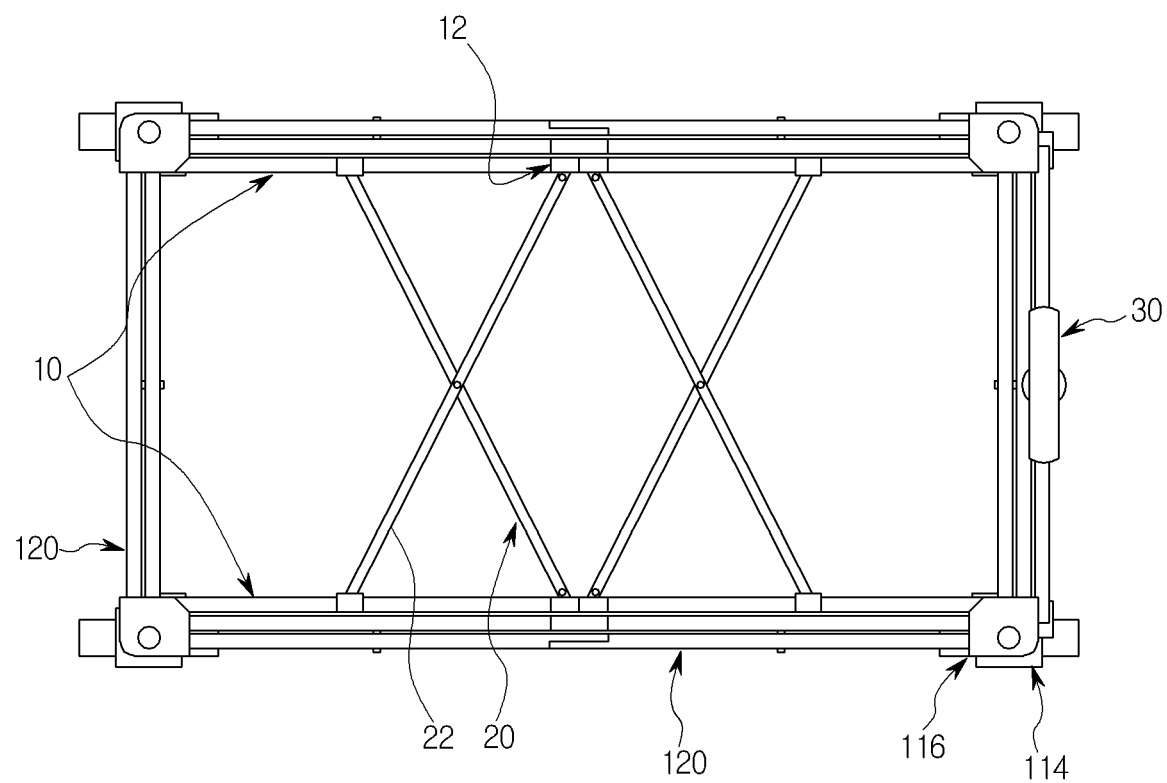
FIG. 2 is a plan view of the portable folding cart according to the present invention.
Figure 3:
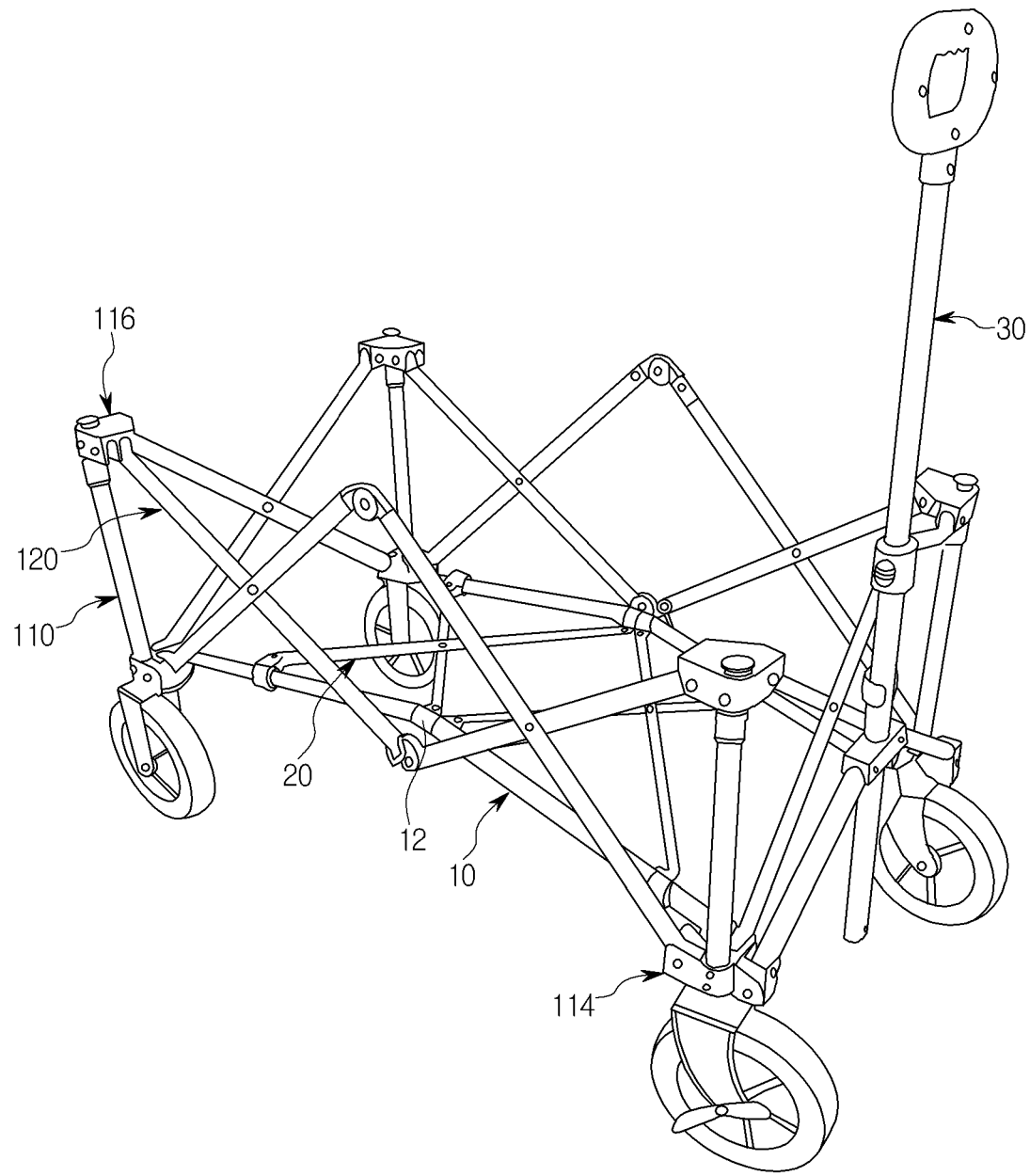
FIGS. 3 to 5 are views sequentially describing a process of folding the portable folding cart according to the present invention.
Figure 4:
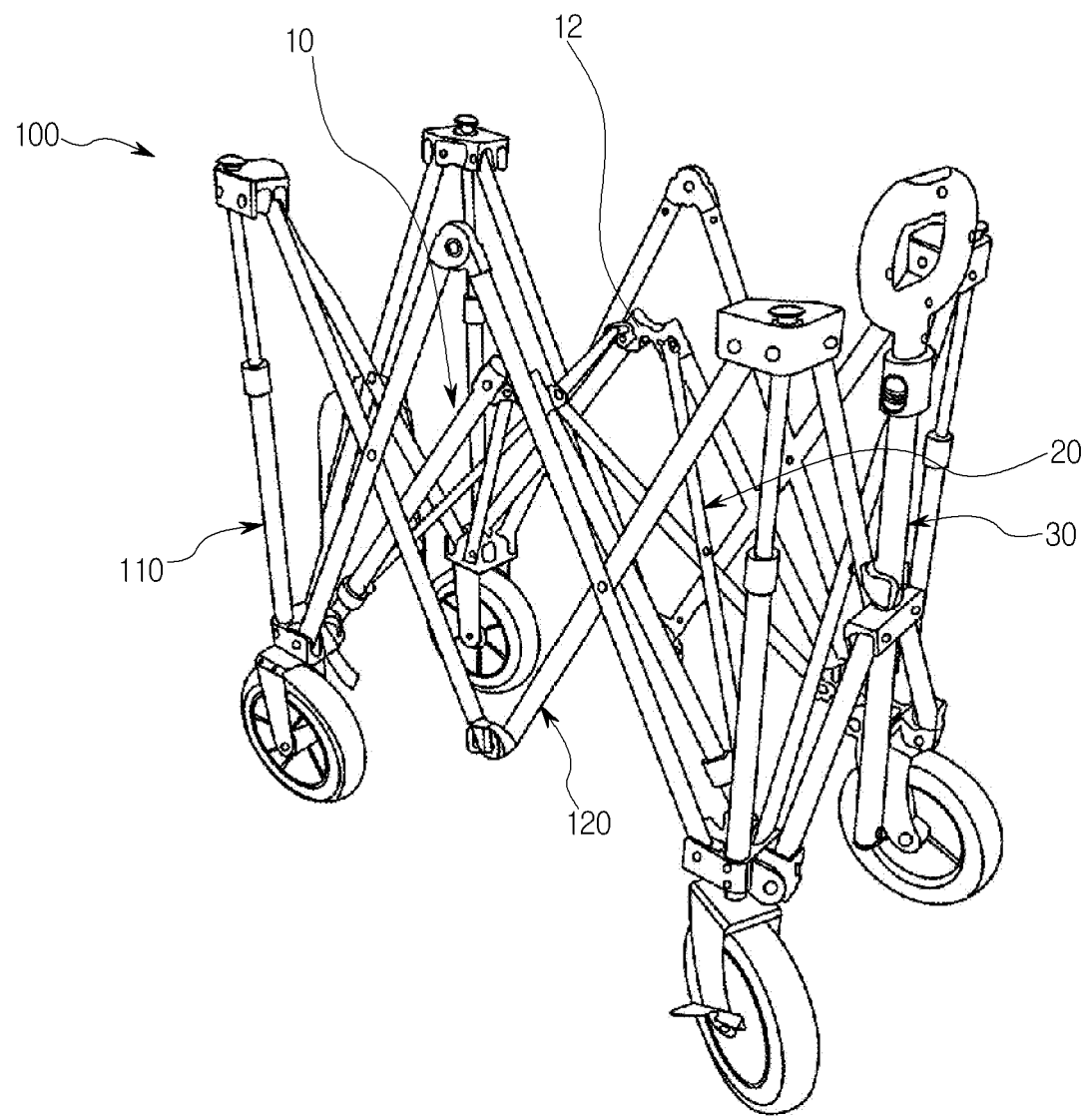
Figure 5:
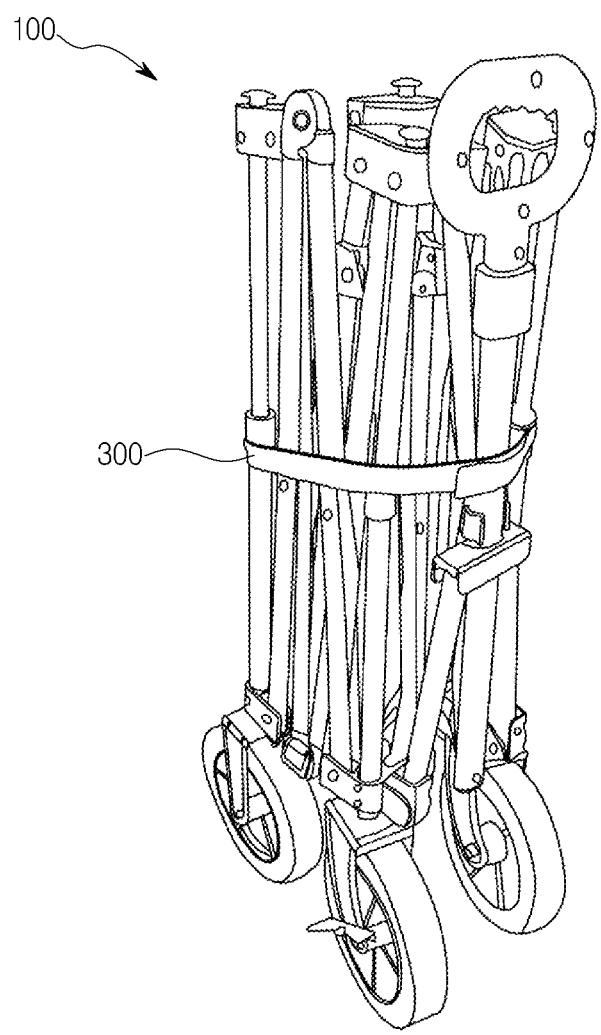
Figure 6:
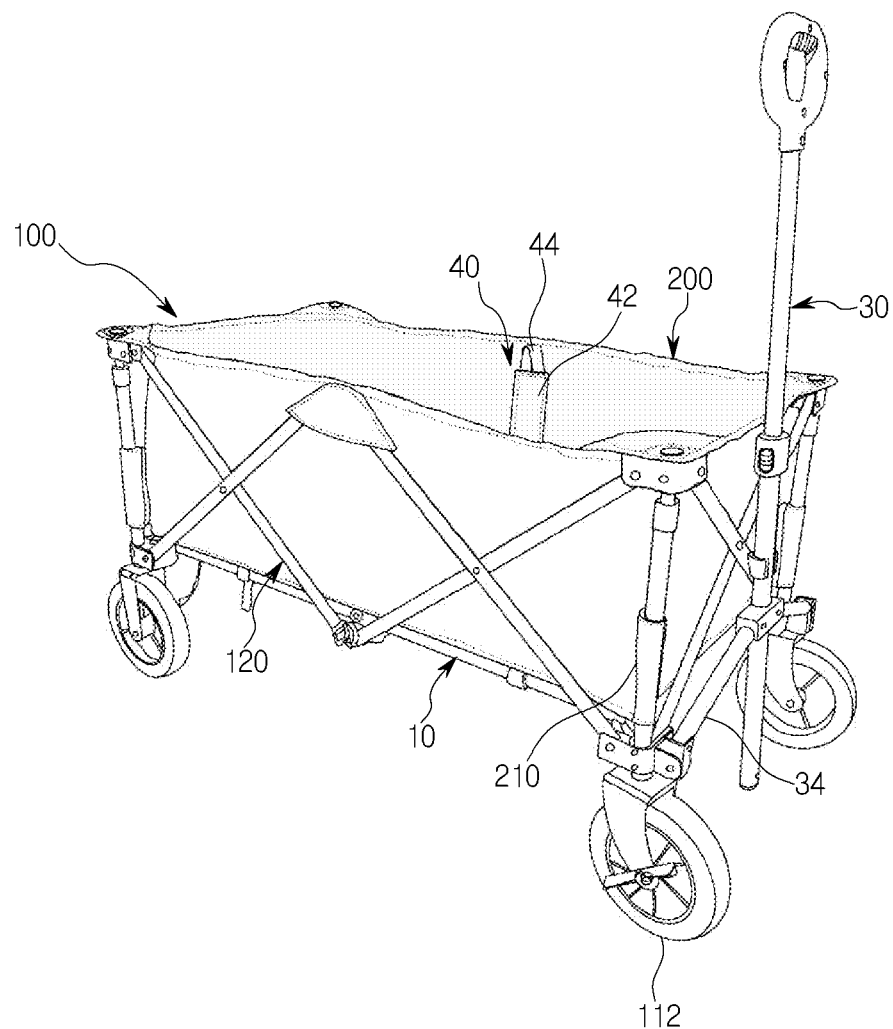
FIG. 6 is a perspective view showing a state in which a liner is coupled to the portable folding cart according to the present invention.
Figure 7:
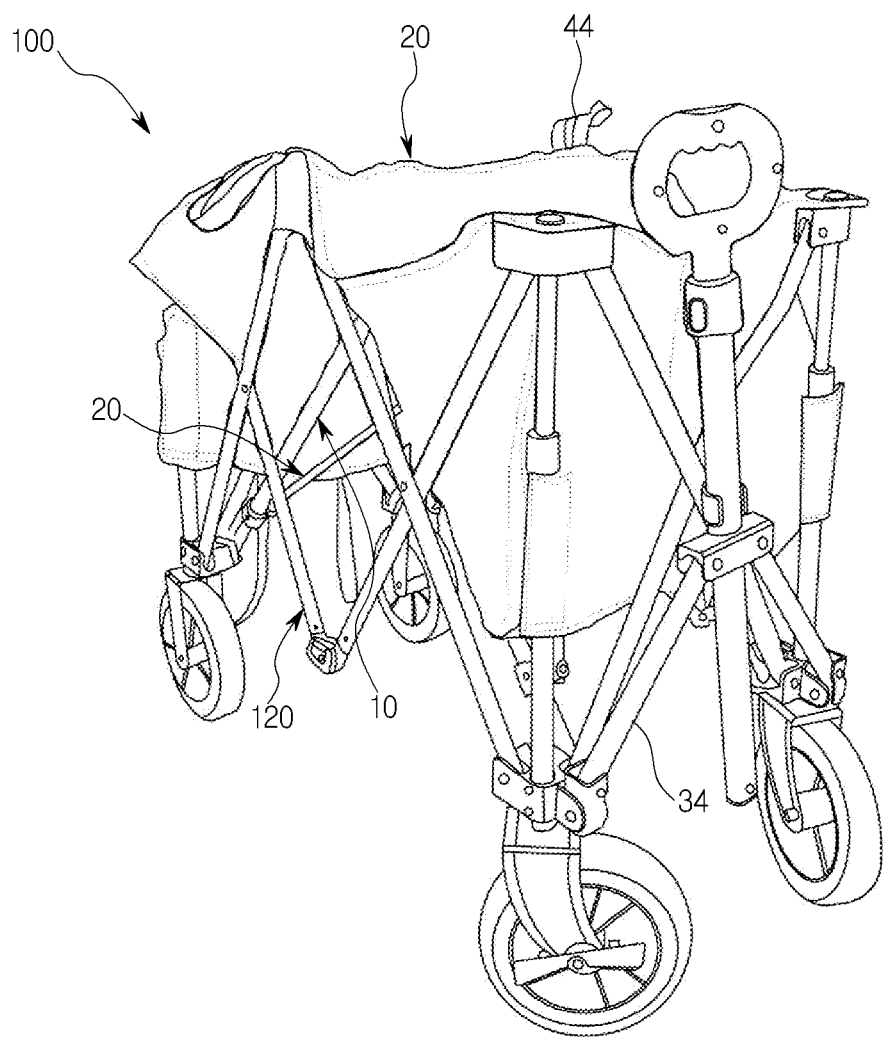
FIGS. 7 and 8 are views sequentially describing a state in which the liner is fold on the portable folding cart shown in FIG. 6.
Figure 8:
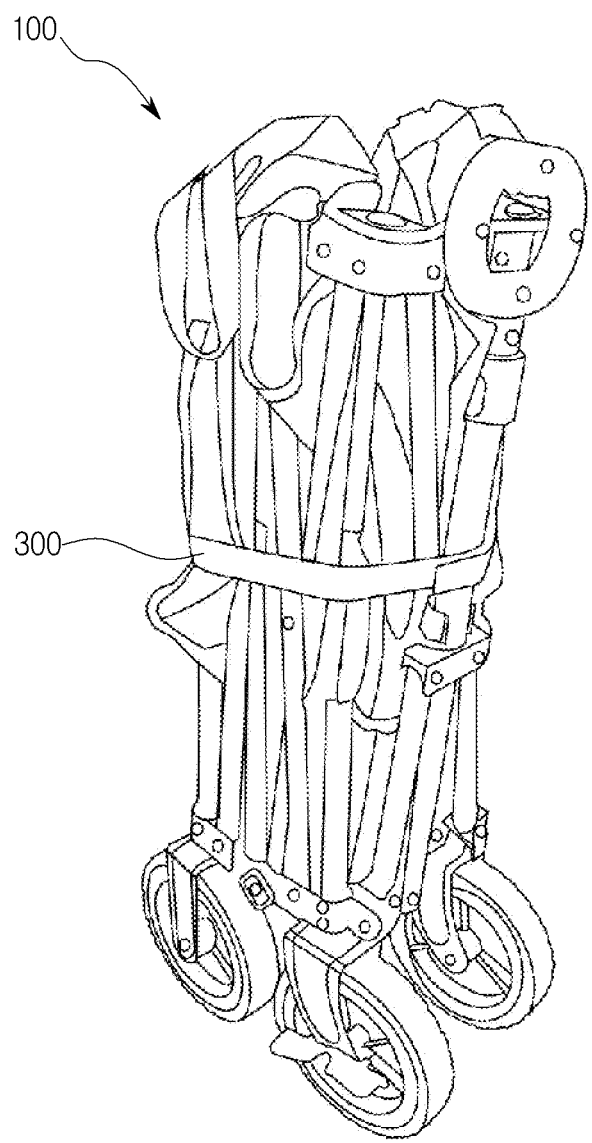

FIG. 1 is a perspective view showing a portable folding cart according to the present invention. FIG. 2 is a plan view of the portable folding cart shown in FIG. 1. FIGS. 3 to 5 are views sequentially describing a process of folding the portable folding cart. FIG. 6 is a perspective view showing a state in which a liner is coupled to the portable folding cart according to the present invention. In addition, FIGS. 7 and 8 are views sequentially showing a state in which the liner is coupled to the portable folding cart according to the present invention.

The portable folding cart 100 according to the present invention is one of movable carrying tools. The portable folding cart may be folded and stored when not in use and unfolded when in use so as to be used to accommodate and move a necessary object, and may be implemented using components described below.

A caster 112 including a stopper 112A and a lower socket 114 connected to the caster 112 may be installed at each lower corner of the portable folding cart 100. Upper sockets 116 are located at tops of the portable folding cart 100, and the upper socket 116 is connected to the caster 112 by the corner bar 110.

One pair of lower socket 114 and upper socket 116 that are installed at one corner of the portable folding cart 100 and connected to each other by a common corner bar 110, and another pair of lower socket 114 and upper socket 116 that are installed at the corners facing the above-described one corner and connected to each other by a common corner bar 110 are coupled to a scissors-bar assembly 120 so that folding and unfolding processes are performed. Herein, the folding denotes that the two pairs of the lower sockets 114 and the upper sockets 116 facing each other move in a direction close to each other, and the unfolding denotes that the two pairs of sockets 114 and upper sockets 116 move in a direction away from each other, respectively.

FIG. 1 shows that four pairs of lower sockets 114 and upper sockets 116 are installed at the corners of the portable folding cart 100, and the two pairs of sockets 114 and upper sockets 116 face each other based on a moving direction of the portable folding cart 100, respectively.

Each scissors-bar assembly 120 shown in FIG. 1 may be implemented with four scissors-bars 122. Two ends of two scissors-bars 122 coupled to each other in a pinned or hinged coupling manner at an intersecting portion therebetween may be rotatably connected to the lower socket 114 and the upper socket 116 installed at one corner, in a pinned or hinged coupling manner. Two ends of the other two scissors-bars 122 coupled to each other in a pinned or hinged coupling manner at an intersecting portion therebetween may be rotatably connected to the lower socket 114 and the upper socket 116 installed at the facing corner in a pinned or hinged coupling manner. Opposite ends of the two scissors-bars 122 that are not connected to the lower socket 114 or the upper socket 116 may be connected to ends of the other two neighboring scissors-bars in a pinned or hinged manner so as to be folded or unfolded.

Referring to FIG. 6, the portable folding cart 100 according to the present invention may be used by installing a liner 200 having upper corners fitted and fixed to the upper sockets 116, and fixed to the corner bars 110 by pads 210 formed on corner sides of the liner. The pad 210 may be implemented by surrounding and fixing the corner bar 110 by using, for example, a hook-and-loop fastener.

The portable folding cart according to the present invention may include folding rods located inwardly from the scissors-bar assemblies 120 that are folded or unfolded so as to allow the user to conveniently and stably fold or unfold the liner 200 with the scissors-bar assemblies 120 without lying or bending down. In particular, as the user pulls both sides of the liner 200 upwards in the folding process, the user can simply and quickly fold the portable folding cart.

The portable folding cart 100 according to the present invention includes two folding rods 10, a base structure 20, a tow rod 30, and pulling devices 40.

According to a dotted circle of FIG. 1, each of the folding rods 10 has first folding rod and second folding rod. One ends of the first folding rod and the second folding rod are rotatably connected to the lower sockets 114 located at front and rear sides in the progressive direction of the portable folding cart 100, respectively. The other ends of the first folding rod and the second folding rod are connected to a folding bracket 12. According to the dotted circle of the FIG. 1, the folding bracket 12 is folded upward only in an inversed 'V' shape, so that the folding rod 10 is folded and unfolded together with the scissors-bar assemblies 120.

The two folding rods 10 are configured to allow the scissors-bars assemblies 120 provided between the corner bars 110 to be folded as the folding brackets 12 are lifted upward.

Accordingly, the pulling devices described below are connected to the folding brackets such that the user can easily and conveniently fold the portable folding cart by pulling up the folding brackets without bending a waist.

Further, when the folding brackets of the folding rods descend, the portable folding cart can be unfolded, and when the corner bars located longitudinally or laterally are unfold, the portable folding cart can be easily unfolded.

In addition, since the folding rods are located laterally, the user can easily fold the portable folding cart with a minimal force when the user pulls up the folding rods from both sides of the portable folding cart, and the folding process can also be stably performed.

The base structure 20 is configured to be folded and unfolded between the folding rods 10 while serving to support an accommodated object.

In other words, the base structure 20 may be configured such that a pair of scissors-bars folded and unfolded at both sides of the folding brackets 12 are connected to both of the folding rods 10. Facing ends of the pair of scissors-bars 22 may be rotatably fixed to the folding brackets 12 in a conventional pinned coupling manner or the like, and opposite ends of the pair of scissors-bars 22 may be rotatably connected to the folding rods 10.

Herein, the ends of the scissors-bar 22 slidable on the folding rods 10 may be rotatably connected to slide holders 24 provided on the folding rods 10 in a conventional pinned coupling manner or the like.

Accordingly, the base structure in an unfolded state may serve to support a bottom of the accommodated object.

Further, in the process that the folding rods and the scissors-bar assemblies are folded, when the portions fixed to the folding brackets are raised, the opposite sides are slid by the slide holders on the folding rods, and thus the folding rods and the scissors-bar assemblies are narrowly folded.

Accordingly, the folding rods, the scissors-bar assemblies, and the base structure may be folded to have a minimum volume.

The tow rod 30 may include a support rod 34 having both ends rotatably connected to front corner bars 10 through the lower sockets in a conventional pinned coupling manner or the like, and a middle portion rotatably connected to a connection bracket 32 in a conventional pinned coupling manner or the like; and a handle 35 provided at a top of tow rod, so as to be telescopically coupled with the connection bracket 32.

The tow rod 30 may include first and second tow rods 30A and 30B having diameters different from each other, so that the tow rod may be telescopically moved as a fixing holder 30C provided at a sliding portion of the tow rod is generally fastened or released. According to a known technical configuration, the fixing holder may be coupled, in a conventional screw-coupling manner, to a tow rod that is not sliding, and a plurality of tightening pieces may be formed on an inner surface thereof, so that the tightening pieces, upon tightening, engage and fix the tow rod configured to be slid.

In other words, the first and second tow rods have a structure in which one is slidable after inserted into the other one, and thus the height is adjustable according to the conventional tightening and releasing of the fixing holder provided in the sliding portion.

Accordingly, the portable folding cart can be easily towed by properly adjusting according to the user's physical condition upon towing, and the portable folding cart can be slid at the minimal height to be easily stored, when the portable folding cart is folded.

The pulling devices 40 may be connected to the folding brackets 12 on both sides of the liner 200, respectively, so that the scissors-bar assemblies 120, the folding rods 10 and the support rod 34 are folded.

The pulling devices 40 may include guide pockets 42 formed on inner surfaces of the both sides of the liner 200, and pulling straps 44 disposed inside the guide pockets 42 and connected to the folding brackets 12, respectively. The guide pocket may serve to prevent the pulling strap from interfering with the accommodated object and protect the pulling strap.

In the process of connection between the pulling strap and the folding bracket, a connection tool such as a conventional coupling strap or ring may be connected and fixed to a bottom surface of the liner, at which the folding bracket is located, and an end of the pulling strap may be fixedly connected to an inner side of the liner at which the connection tool is located.

In addition, a through-hole may be formed in the bottom surface of the liner at which the folding bracket is located, and then the end of the pulling strap may be directly coupled to the folding bracket.

Accordingly, when the pulling straps 44 of the pulling devices are pulled up and raised upwards in a state where the portable folding cart 100 is unfolded as shown in FIG. 6, the folding rods 10 may be folded as shown in FIGS. 7 and 8, and thus the scissors-bar assemblies 120, the base structure 20 and the support rod 34 may be folded.

Accordingly, when the folding of the portable folding cart 100 is completed, the portable folding cart may be bound using a conventional binding band 300 or the like to prevent the portable folding cart from being easily unfolded.

Meanwhile, as shown in FIG. 5, the portable folding cart 100 according to the present invention may be folded and bound using the binding band 300, after the liner is separated.

Therefore, according to the present invention, upon folding and unfolding the portable folding cart, the folding rods provided at the both sides of the portable folding cart in the longitudinal direction may allow the user to pull up the both sides without bending a waist, so that the portable folding cart can be conveniently and stably folded without inconvenience.

What is claimed is:

1. A portable folding cart comprising:
   corner bars located at corners of a rectangle and provided at bottoms thereof with casters and lower sockets and at tops thereof with upper sockets, respectively;
   scissors-bar assemblies configured to be folded or unfolded between the lower sockets and the upper sockets;
   a liner which has upper corners fixed to the upper sockets and is fixed to the corner bars by pads formed on corner sides of the liner;
   two folding rods in which each folding rod includes first and second folding rods and a folding bracket, each of the first and second folding rods having one end rotatably connected to the respective lower sockets located at front and rear sides in a progressive direction of the portable folding cart, respectively, and having another end respectively connected to the respective folding bracket configured to be folded upward only in an inversed 'V' shape, such that the two folding rods are configured to be folded or unfolded together with the scissors-bar assemblies;
   a base structure including a pair of scissors-bars configured to be folded or unfolded at both sides of the folding brackets and connected to the two folding rods, in which ends of the pair of scissors-bars, which face each other, are rotatably fixed to the folding brackets, and opposite ends of the pair of scissors-bars are slidably connected to the folding rods;
   a tow rod including a support rod having both ends rotatably connected to the lower sockets and a middle portion thereof rotatably connected to a connection bracket, and a handle provided at a top of the tow rod to allow the tow rod to be telescopically coupled with the connection bracket; and
   pulling devices provided on both sides of the liner and connected to the folding brackets to allow the scissors-bar assemblies, the folding rods, and the support rod to be folded.

2. The portable folding cart of claim 1, wherein the opposite ends of the pair of scissors-bars slidably provided to the folding rods are rotatably connected to slide holders provided on the folding rods.

3. The portable folding cart of claim 1, wherein the tow rod includes first and second tow rods having diameters different from each other, so that the tow rod is telescopically movable as a fixing holder provided at a sliding portion of the tow rod is fastened or released.

4. The portable folding cart of claim 1, wherein the pulling devices include guide pockets formed on inner surfaces of both sides of the liner, and pulling straps disposed inside the guide pockets and connected to the folding brackets, respectively.

\* \* \* \* \*